United States Patent [19]

Ernst et al.

[11] 3,998,936
[45] Dec. 21, 1976

[54] PROCESS FOR REGENERATING HYDROGENATION CATALYST ACTIVITY IN HYDROGEN PEROXIDE SYNTHESIS

[75] Inventors: Richard Edward Ernst, Cochranville, Pa.; Bijan Amini, Port Monmouth, N.J.; William John Bareford, Memphis, Tenn.

[73] Assignee: E. I. Du Pont de Nemours and Company, Wilmington, Del.

[22] Filed: Apr. 23, 1975

[21] Appl. No.: 570,720

[52] U.S. Cl. .............................................. 423/588
[51] Int. Cl.² ........................................ C01B 15/02
[58] Field of Search .................... 252/414; 423/588

[56] References Cited

UNITED STATES PATENTS

| | | | |
|---|---|---|---|
| 2,657,980 | 11/1953 | Sprauer | 423/588 |
| 2,692,240 | 10/1954 | Spraur | 252/414 |
| 2,914,382 | 11/1959 | Holmes et al. | 423/588 |
| 3,004,831 | 10/1961 | Hungerford et al. | 423/588 |
| 3,165,478 | 1/1965 | Hauschild et al. | 252/414 |
| 3,694,376 | 9/1972 | Kabisch et al. | 423/588 |
| 3,887,490 | 6/1975 | Schreyer et al. | 423/588 |

FOREIGN PATENTS OR APPLICATIONS

| | | | |
|---|---|---|---|
| 7,009,949 | 1/1971 | Netherlands | 423/588 |
| 1,348,071 | 3/1974 | United Kingdom | |

*Primary Examiner*—Earl C. Thomas
*Assistant Examiner*—Wayne A. Langel

[57] ABSTRACT

Catalytic activity of a platinum group metal catalyst used in catalyzing the hydrogenation of a working solution of an alkylanthraquinone in a water-immiscible solvent in the manufacture of hydrogen peroxide, said catalyst having become at least partially inactivated, is regenerated by a process comprising contacting the catalyst in the presence of the working solution and in the absence of hydrogen with an oxidizing agent selected from the group consisting of an oxygen-containing gas and hydrogen peroxide.

When the process of the invention is made an integral part of the cyclic anthraquinone process for producing hydrogen peroxide, there results an improvement in the latter process whereby the activity of the catalyst can be maintained at a high level.

3 Claims, No Drawings

PROCESS FOR REGENERATING HYDROGENATION CATALYST ACTIVITY IN HYDROGEN PEROXIDE SYNTHESIS

BACKGROUND OF THE INVENTION

This invention relates to an improvement in a process for making hydrogen peroxide by the cyclic anthraquinone process. More particularly, it relates to a process of regenerating activity of the platinum group metal catalyst used in said cyclic process.

Hydrogen peroxide is produced by a cyclic process in which an alkylanthraquinone dissolved in a water-immiscible solvent is hydrogenated in a reducing stage to produce the corresponding alkylanthrahydroquinone which is then oxidized to regenerate the alkylanthraquinone and to produce hydrogen peroxide. Hydrogen peroxide produced during oxidation is removed by extraction with water and the remaining solution which is called the working solution is recycled to the reduction stage. The hydrogenation is usually done in the presence of a catalyst in the form of a fixed bed or slurry. Due to various factors the catalyst undergoes a gradual reduction in activity which leads to excessive catalyst cost or time-consuming and expensive regeneration steps. Several methods of regenerating the catalyst without removal of it from the hydrogenation stage have been proposed.

British Patent Specification 1,348,071, published Mar. 13, 1974, discloses a method of reactivating the catalyst wherein the catalyst is regenerated in the hydrogenation stage during hydrogenation at full output by providing that the working solution coming from the extraction stage has a reactive hydrogen peroxide content of at least 250 mg. per liter of working solution. It is to be noted that in prior art methods, such as the above, regeneration is effected in the presence of hydrogen.

U.S. Pat. No. 3,004,831, issued to Hungerford et al. on Oct. 17, 1961, discloses a process for regenerating the hydrogenation catalyst used in an anthraquinone process by subjecting the catalyst in the hydrogenation stage to a periodic reduction in the hydrogen pressure, accompanied by introduction of inert gas. Hydrogenation itself must either be throttled to a considerable extent or stopped altogether during regeneration.

In spite of these proposed methods, there is still a need for improved methods of regenerating or maintaining activity of the catalyst used in the hydrogenation stage of a cyclic process for making hydrogen peroxide.

SUMMARY OF THE INVENTION

A process for regenerating activity of the catalyst used in the hydrogenation stage of the cyclic anthraquinone process for producing hydrogen peroxide has been discovered.

Specifically it has been found that catalytic activity of a platinum group metal catalyst used in catalyzing the hydrogenation of a working solution of an alkylanthraquinone in a water-immiscible solvent in the manufacture of hydrogen peroxide, said catalyst having become at least partially inactivated, is regenerated by a process comprising contacting the catalyst in the presence of the working solution and in the absence of hydrogen with an oxidizing agent selected from the group consisting of an oxygen-containing gas and hydrogen peroxide.

This invention is further directed to an improvement in the cyclic anthraquinone process for producing hydrogen peroxide wherein a working solution of an alkylanthraquinone in a water-immiscible solvent is hydrogenated in the presence of a platinum group metal catalyst in a reduction stage to produce a solution of the corresponding alkylanthrahydroquinone, said solution of alkylanthrahydroquinone is separated from the catalyst and then oxidized to regenerate a solution of the alkylanthraquinone and to produce hydrogen peroxide which is extracted, and the solution of alkylanthraquinone is recycled to the reduction stage. The improvement comprises regenerating or maintaining the activity of the catalyst by contacting the catalyst in situ in the absence of hydrogen with an oxidizing agent selected from the group consisting of an oxygen-containing gas and hydrogen peroxide.

The process of the invention surprisingly provides an increase of up to about 65% or more in activity of the catalyst in a batch regeneration or an increase of up to about 35% in activity of the catalyst during continuous operation of the cyclic process.

DETAILED DESCRIPTION OF THE INVENTION

In the cyclic anthraquinone process for making hydrogen peroxide a working solution of an alkylanthraquinone in a water-immiscible solvent is hydrogenated in the presence of a platinum group metal catalyst in a reduction stage to produce a solution of the corresponding alkylanthrahydroquinone, the catalyst is separated from the solution after which the alkylanthrahydroquinone is oxidized to regenerate a solution of alkylanthraquinone and to produce hydrogen peroxide. Hydrogen peroxide is extracted and the remaining alkylanthraquinone solution which often contains a residual amount of hydrogen peroxide is recycled to the reduction stage.

According to the process of the invention, activity of the catalyst used in the reduction stage can be maintained or regenerated in situ by contacting the catalyst in the absence of hydrogen with an oxidizing agent selected from the group consisting of an oxygen-containing gas and hydrogen peroxide. In the process of the invention regeneration is effected as an integral step in the cyclic process for making hydrogen peroxide or externally to said process.

The expression "in the absence of hydrogen" as used herein is meant to denote that only insignificant amounts of hydrogen may be present, such as the about 0.01% by volume of hydrogen present in air. The expression "in situ" as used herein means that the catalyst remains in the presence of the working solution as compared to some prior art processes for regeneration wherein separation of catalyst from working solution is required.

Regeneration by using hydrogen peroxide in the absence of hydrogen is effected by adding aqueous hydrogen peroxide to the catalyst slurry in an amount sufficient to bring about an increase in catalyst activity within a desired time period. In general, in the process of the invention, the concentration of hydrogen peroxide present during regeneration or, likewise, the amount of oxygen in relation to the amount of catalyst and the time of treatment are not critical and are somewhat interdependent. However, when regeneration as taught herein is effected as part of the hydrogen peroxide process in a preferred continuous mode using hydrogen peroxide as the oxidizing agent, the concentration of hydrogen peroxide is, preferably, from about 0.002–0.040 mole per liter of working solution and, most preferably from about 0.01–0.03 mole per liter of solution. A hydrogen peroxide concentration significantly below or in excess of the prescribed range, while being operable, would, respectively, require a rather long time to effect regeneration or be somewhat wasteful.

In a highly preferred embodiment of this continuous mode, regeneration by using hydrogen peroxide is conveniently effected by contacting the catalyst in the absence of hydrogen with recycle anthraquinone solution in the state in which it leaves the extraction stage of the cyclic process, since unextracted hydrogen peroxide is usually present in the recycle solution at concentrations within the preferred range. If the level of hydrogen peroxide present in the recycled solution leaving the extraction stage is below the preferred range, hydrogen peroxide can be mixed with the recycled solution until its concentration is within said range.

In the process of the invention the catalyst can also be regenerated by contacting it with an oxygen-containing gas, although regeneration by using hydrogen peroxide is preferred. The expression "oxygen-containing gas" as used herein is defined as a gas containing at least about 10% oxygen by volume with all other constituents being inert to hydrogen peroxide and catalyst slurry contents. Suitable gases include oxygen and air with oxygen being preferable. The catalyst is treated with sufficient molecular oxygen or air to achieve a desired level of regeneration. Typically, molecular oxygen is passed through a catalyst slurry or over a catalyst bed at a rate sufficient to accomplish regeneration within about 0.5–2 hours.

The catalysts utilized in the reduction stage and the activity of which is regenerated by the present process is a platinum group metal, such as ruthenium, rhodium, palladium, osmium, iridium or platinum. Palladium metal is preferred. The catalyst is usually dispersed on a support such as alumina, activated magnesia, aluminosilicates, titanium dioxide, an alkaline earth metal carbonate, such as dolomite, and ion exchange resins. In a slurry system the catalyst concentration in a slurry consisting of catalyst and working solution is from about 5–15% by weight.

The alkylanthraquinone employed in the cyclic anthraquinone process and in the presence of which regeneration is effected is not critical and any of the prior art compounds can be employed. Typical alkylanthraquinones include 2-ethyl-, 2-amyl-, and 2-t-butylanthraquinones. The alkylanthraquinone is dissolved in a water-immiscible solvent. Generally, a mixture of solvents is used, one of which is a good solvent for the alkylanthraquinone and the other is a good solvent for the corresponding alkylanthrahydroquinone. Suitable solvents of the first kind are $C_8$ to $C_{17}$ ketones, anisole, benzene, xylene, trimethylbenzene, methylnaphthalene and the like. Suitable solvents of the second kind include $C_5$ to $C_{12}$ alcohols, such as diisobutylcarbinol and heptyl alcohol, methylcyclohexanol acetate, and phosphoric acid esters, such as trioctyl phosphate.

In the present improved cyclic anthraquinone process for making hydrogen peroxide, hydrogenation of the alkylanthraquinone, oxidation of the alkylanthrahydroquinone and extraction of the hydrogen peroxide produced thereby are accomplished by methods well-known in the art.

In the process of the invention regeneration is accomplished in situ in the reduction stage, a sidestream thereto or in a tank which is external to the cyclic anthraquinone process for making hydrogen peroxide. Separation of the catalyst from the working solution is not necessary in the present invention. The process of the invention is applicable to a fixed bed or slurry system and can be effected in a batch or continuous mode. It is preferred to operate the present process in a continuous manner as an integral part of the cyclic process using a catalyst-slurry system. This preferred embodiment can be effected in any suitable manner. For instance, catalyst slurry can be extracted as a sidestream from the hydrogenator or reduction stage, contacted with recycled working solution of the alkylanthraquinone in any suitable vessel and returned to the hydrogenator at such a rate as to maintain catalyst activity and amount at a desired level. Alternatively, regeneration of the catalyst can be effected in a manner in which the overall activity of the catalyst is allowed to diminish to some minimum value and then the catalyst is reactivated to increase the overall activity to a desired value.

Regeneration is accomplished in the hydrogenator itself by stopping the hydrogen flow, purging the hydrogenator with nitrogen and then purging with an oxygen-containing gas, adding aqueous hydrogen peroxide, or admitting recycle solution containing unextracted hydrogen peroxide. In a fixed bed system the process of the invention can be implemented by stopping the hydrogenation, purging the hydrogenator with nitrogen to remove hydrogen gas and then treating the bed of catalyst with hydrogen peroxide or passing an oxygen-containing gas over and through the catalyst. When regeneration is accomplished in a batch mode such as described previously in this paragraph, it is done at a frequency sufficient to maintain a desired average catalyst activity for some set period of time, such as a 24-hour period. Regeneration can be effected externally to the cyclic process for producing hydrogen peroxide by withdrawing the entire catalyst slurry and introducing it into an external tank wherein it is treated with oxidizing agent.

Regeneration of the catalyst as described herein is conducted at temperatures normally employed in the cyclic anthraquinone process, i.e., about 30° to 70° C. and at about one atmosphere of pressure.

The process of the invention provides a method of producing hydrogen peroxide by the cyclic anthraquinone process whereby in a preferred embodiment catalyst activity is maintained by a continuous withdrawal of catalyst slurry, reactivation as described herein, and return of the reactivated catalyst to the reduction stage while the cyclic process is operated on a continuous basis.

The process of the invention is further illustrated by the following examples in which all percentages are by weight unless otherwise specified.

EXAMPLE 1

In a working solution consisting of 23% of alkylanthraquinones, corresponding to .83 mole per liter of solution, which were a mixture of 2-t-butyl- and 2-amylanthraquinones and the corresponding tetrahydro derivatives dissolved in a mixed solvent consisting of diisobutylcarbinol and "Cyclosol" 63, which is a product of Shell Chemical Co. of Houston, Texas, and is a mixture of predominantly $C_3$–$C_5$ substituted polyalkyl benzenes, there was suspended sufficient catalyst to make a 7% slurry based upon the weight of the working solution. The catalyst was 0.6% palladium on activated alumina. The resulting working solution was passed to a hydrogenator wherein the alkylanthraquinones were hydrogenated at 50° C. and one atmosphere of hydrogen pressure. Working solution containing alkylanthrahydroquinones was filtered and passed to an oxidizer wherein the alkylanthrahydroquinones were oxidized at 50° C. and one atmosphere of oxygen pressure to form hydrogen peroxide and the starting alkylanthraquinones.

Hydrogen peroxide was extracted from the working solution by using a countercurrent flow of water. The remaining solution of alkylanthraquinones was recycled to the hydrogenator and the above-described process was continued.

After the process reached a steady state, the working solution returning from the extractor and having an unextracted $H_2O_2$ concentration of about 0.014 mole per liter was first passed through a reactivation vessel providing a four-minute holdup time before the solution was returned to the hydrogenator. To this vessel was added a sidestream of the hydrogenator slurry at a rate of about 13% of the contents of a hydrogenator per hour. The process was run continuously for four weeks with this system in operation. At one point in the run while operating under steady state conditions with an alkylanthrahydroquinone concentration of 0.39 mole per liter and a recycle $H_2O_2$ concentration of 0.014 mole per liter, the slurry stream to the reactivation vessel was turned off. The concentration of alkylanthrahydroquinone fell to 0.30 mole per liter after 24 hours and then to 0.28 mole per liter after 24 hours more. After the slurry stream to the reactivation vessel was restarted, the activity of the catalyst increased such that after 7 hours the alkylanthrahydroquinone content of the working solution leaving hydrogenator was 0.36 mole per liter.

EXAMPLE 2

In this example hydrogen peroxide was produced in a manner similar to that described in Example 1 except that the slurry hydrogenator was replaced with a fixed bed hydrogenator in which the catalyst was 0.3% palladium on activated alumina support and a reactivation vessel was not used. While operating with an alkylanthrahydroquinone concentration of 0.09 mole per liter, hydrogen and working solution flows to the hydrogenator were stopped, and the hydrogen was removed from the bed by using a nitrogen purge. Next, the bed was purged with oxygen at atmospheric pressure for one hour and then with nitrogen again. When the hydrogen and working solution feeds were restarted, it was found that the activity of the catalyst had increased such that the alkylanthrahydroquinone content of the hydrogenator effluent was 0.30 mole per liter.

EXAMPLE 3

The procedure used in this example was similar to that described in Example 1 except that a reactivation vessel was not employed.

The process was run under steady state conditions and the activity of the catalyst was such that the working solution leaving the hydrogenator had an alkylanthrahydroquinone content of 0.20 mole per liter. Hydrogen feed was stopped and the hydrogenator was purged with nitrogen to remove hydrogen. The working solution feed was stopped and an aqueous solution containing 35% hydrogen peroxide was added to the hydrogenator in an amount sufficient to give 0.015 mole of $H_2O_2$ per liter of hydrogenator contents.

After continuing the nitrogen purge for an additional 30 minutes, working solution and hydrogen feed were restarted. The activity of the catalyst had increased such that the hydrogenator effluent had an alkylanthrahydroquinone content of 0.34 mole per liter.

EXAMPLE 4

The procedure used in this experiment was similar to that in Example 3, except that the working solution and hydrogen feeds to the hydrogenator were turned off together when the alkylanthrahydroquinone content of the working solution leaving the hydrogenator was 0.20 mole per liter. After a nitrogen purge, the hydrogenator was purged for 30 minutes with oxygen at atmospheric pressure and then again with nitrogen. When the working solution and hydrogen feeds were restarted, the catalyst activity had increased such that the alkylanthrahydroquinone content of the working solution leaving the hydrogenator was 0.31 mole per liter.

In a control experiment in which the hydrogen flow was stopped, the system purged with nitrogen, and then hydrogen flow restarted, no effect on catalyst activity was found.

We claim:
1. In a continuous cyclic process for making hydrogen peroxide in which
   1. a working solution of alkylanthraquinone dissolved in water-immiscible solvent having a platinum group metal catalyst dispersed therein is hydrogenated to convert the anthraquinone to anthrahydroquinone;
   2. the catalyst is removed from the working solution;
   3. the catalyst-free working solution is oxidized to form hydrogen peroxide and reconvert the anthrahydroquinone to anthraquinone;
   4. the oxidized working solution is solvent extracted to remove hydrogen peroxide therefrom; and
   5. the extracted anthraquinone-containing working solution is recycled to the hydrogenation step,
   the improvement comprising continuously
     a. withdrawing a sidestream of the catalyst-containing working solution from step (1);
     b. combining the sidestream of working solution from step (1) with a sidestream of extracted working solution from step (5) in the absence of hydrogen in an amount sufficient to provide 0.002–0.040 mole hydrogen peroxide per liter of combined solution; and
     c. returning the combined working solutions to step (1) of the process.

2. The process of claim 1 wherein the unextracted hydrogen peroxide concentration is from about 0.01–0.03 mole per liter of solution.

3. The process of claim 1 in which the hydrogen peroxide content of the extracted working solution sidestream is augmented by the addition of hydrogen peroxide.

* * * * *